United States Patent
Koseki et al.

(10) Patent No.: US 10,968,379 B2
(45) Date of Patent: Apr. 6, 2021

(54) HEAT-STORAGE COMPOSITION

(71) Applicant: DIC Corporation, Tokyo (JP)

(72) Inventors: Yuko Koseki, Saitama (JP); Kenichi Fujisaki, Saitama (JP); Junichirou Koike, Chiba (JP); Kyouichi Toyomura, Tokyo (JP)

(73) Assignee: DIC Corporation, Tokyo (JP)

( * ) Notice: Subject to any disclaimer, the term of this patent is extended or adjusted under 35 U.S.C. 154(b) by 98 days.

(21) Appl. No.: 16/212,810

(22) Filed: Dec. 7, 2018

(65) Prior Publication Data

US 2019/0106612 A1 Apr. 11, 2019

Related U.S. Application Data

(63) Continuation of application No. PCT/JP2017/022080, filed on Jun. 15, 2017.

(30) Foreign Application Priority Data

Jun. 22, 2016 (JP) .............................. JP2016-123546

(51) Int. Cl.
| | |
|---|---|
| *C09K 5/06* | (2006.01) |
| *C08K 9/10* | (2006.01) |
| *C08K 5/1515* | (2006.01) |
| *C08L 101/12* | (2006.01) |
| *C08L 27/06* | (2006.01) |
| *C08L 63/00* | (2006.01) |

(52) U.S. Cl.
CPC ............ *C09K 5/063* (2013.01); *C08K 5/1515* (2013.01); *C08K 9/10* (2013.01); *C08L 27/06* (2013.01); *C08L 63/00* (2013.01); *C08L 101/12* (2013.01); *C08L 2205/03* (2013.01); *C08L 2205/06* (2013.01); *C08L 2205/20* (2013.01); *C09K 5/06* (2013.01)

(58) Field of Classification Search
CPC . C09K 5/063; C09K 5/06; C08K 9/10; C08K 5/1515; C08K 5/0016; C08L 101/12; C08L 27/06; C08L 63/00; C08L 2205/03; C08L 2205/06; C08L 2205/20; C08J 5/18
USPC ............................................. 252/70, 71, 73
See application file for complete search history.

(56) References Cited

U.S. PATENT DOCUMENTS

| | | | | |
|---|---|---|---|---|
| 7,572,397 | B2 * | 8/2009 | Jahns ..................... | B01J 13/185 264/4.6 |
| 8,754,144 | B2 * | 6/2014 | Jayasuriya ........... | C09D 133/08 522/1 |
| 10,502,499 | B2 * | 12/2019 | Fujisaki .................. | B32B 27/32 |
| 10,619,942 | B2 * | 4/2020 | Fujisaki .................. | B32B 27/34 |
| 2003/0118822 | A1 * | 6/2003 | Jahns ..................... | E04C 2/043 428/402.2 |
| 2008/0069617 | A1 * | 3/2008 | Matsumoto ........ | G03G 21/0035 399/359 |
| 2019/0107334 | A1 * | 4/2019 | Fujisaki ................ | F28D 20/023 |
| 2019/0107335 | A1 * | 4/2019 | Fujisaki ................... | B32B 9/00 |

FOREIGN PATENT DOCUMENTS

| | | |
|---|---|---|
| JP | 2003-284939 A | 10/2003 |
| JP | 2009-51016 A | 3/2009 |
| JP | 2015020383 A * | 2/2015 |
| WO | 2015/098739 A1 | 7/2015 |

OTHER PUBLICATIONS

English translation of WO 2015098739, Jul. 2, 2015. (Year: 2015).*
International Search Report, PCT/JP2017/022080, 2 pages, dated Sep. 5, 2017. (Year: 2017).*
Written Opinion, PCT/JP2017/022080, 6 pages, dated Sep. 5, 2017. (Year: 2017).*
"Measurement unit conversion: decipascal", Wikipedia, 2020, pp. 1-4. (Year: 2020).*

* cited by examiner

*Primary Examiner* — Douglas J McGinty
(74) *Attorney, Agent, or Firm* — Osha Bergman Watanabe & Burton LLP

(57) ABSTRACT

A heat-storage composition includes a resin and a heat storage material. The composition has a viscosity of 100 to 1,000 dPa·s, as measured with a cylinder-type rotational viscometer. The composition also has a storage elastic modulus (G') of 3 Pa or more at an angular frequency of 1 rad/s, as measured by a dynamic viscoelasticity measurement method at a temperature of 25° C. and at a strain of 0.1%.

12 Claims, No Drawings

HEAT-STORAGE COMPOSITION

TECHNICAL FIELD

One or more embodiments of the present invention relate to a heat-storage composition which forms a heat storage material having flexibility advantageously used for maintaining an appropriate temperature for housing spaces of houses and the like and interior spaces of automobiles and the like.

BACKGROUND

Recently, strong demands are being made on housing spaces of houses, offices, and the like wherein energy should be saved, and, in the building materials used in houses and the like, materials that contribute to energy savings are demanded. Generally, heat insulating materials are used in floors, ceilings, walls and the like in an attempt to improve the air-conditioning or heating efficiency, and, for further saving energy, studies are made on various types of materials. Similarly, with respect to closed spaces of automobiles, aircraft and the like, and the inside of refrigerators of refrigerator trucks and the like, demands for saving energy are increasing.

With respect to the above-mentioned material, for example, a material having an encapsulated phase change material mixed into plasterboard is disclosed (see PTL 1). Further, as a material using a flexible material, a heat-storage thermoplastic resin sheet containing a heat storage material in a thermoplastic resin (see PTL 2) and the like are disclosed.

PTL 1: JP-A-2003-284939
PTL 2: JP-A-2009-51016

The above-mentioned material having a phase change material mixed into plasterboard is used in walls or the like so as to increase the heat capacity of the walls or the like, achieving energy savings. However, this material is poor in flexibility or handling properties, and hence the mode of the use of the material is limited.

On the other hand, the above-mentioned sheet using a thermoplastic resin has flexibility due to the use of the thermoplastic resin, but has a thickness as small as about 100 μm. For realizing heat storage performance useful for housing spaces and the like, the heat storage sheet is required to have an increased thickness, but thick film application is difficult using the resin composition used for the above sheet.

SUMMARY

One or more embodiments of the present invention provide a heat-storage composition which is advantageous not only in that the composition enables thick film application, but also in that, when the composition is subjected to thick film application, slump is unlikely to occur.

Further, one or more embodiments of the present invention provide a heat-storage composition which is advantageous in that the composition is easily kneaded during the preparation of the composition.

One or more embodiments of the present invention are directed to a heat-storage composition including a resin and a heat storage material, having a viscosity of 100 to 1,000 decipascal seconds (dPa·s) as measured with a cylinder-type rotational viscometer, and having a storage elastic modulus (G') of 3 Pa or more at an angular frequency of 1 rad/s as measured by a dynamic viscoelasticity measurement method at a temperature of 25° C. and at a strain of 0.1%.

The heat-storage composition of one or more embodiments of the present invention has a specific viscosity and viscoelasticity, and therefore enables thick film application, and, when the composition is subjected to thick film application, slump is unlikely to occur, and hence a thick sheet having a thickness as large as more than 1 mm can be advantageously formed from the heat-storage composition. Thus, a thick sheet can be easily and continuously formed by application from the heat-storage composition, and hence a thick film can be formed from the heat-storage composition without using a method of filling a formed frame with a coating liquid or a method of stacking a plurality of layers on one another, and therefore a heat storage sheet having advantageous heat storage performance can be produced at a low cost. Further, even though the heat-storage composition does not have a very high viscosity, the composition advantageously enables thick film application, and hence blending or kneading of the composition being prepared is not difficult, enabling advantageous preparation of the composition.

The heat-storage composition of one or more embodiments of the present invention is advantageous in that a flexible heat storage sheet having an increased thickness can be formed from the composition with ease and at a low cost. The heat storage sheet formed from the composition can be advantageously applied to various uses that are required to achieve energy savings, such as materials applied to wall materials and wall paper for housing spaces of houses and the like, interior spaces of automobiles, electric trains, aircraft, agricultural hothouses and the like, closed spaces, e.g., the inside of refrigerators of refrigerator trucks and refrigeration equipment, and the inside of aircraft, and electric parts which generate heat, e.g., a CPU and a storage battery for personal computer.

DETAILED DESCRIPTION OF THE EMBODIMENTS

The heat-storage composition of one or more embodiments of the present invention includes a resin and a heat storage material, has a viscosity of 100 to 1,000 decipascal seconds (dPas) as measured with a cylinder-type rotational viscometer, and has a storage elastic modulus (G') of 3 Pa or more at an angular frequency of 1 rad/s as measured by a dynamic viscoelasticity measurement method at a temperature of 25° C. and at a strain of 0.1%

[Resin]

The resin used in the heat-storage composition of one or more embodiments of the present invention is a resin component which forms a matrix upon forming a sheet. As the resin, various types of resins, such as thermoplastic resins, thermosetting resins, and ultraviolet curing resins, can be used. Especially, thermoplastic resins can be preferably used from the viewpoint of facilitating the formation of a coating film. Examples of thermoplastic resins include a vinyl chloride resin, an acrylic resin, a urethane resin, an olefin resin, an ethylene-vinyl acetate copolymer, a styrene-butadiene resin, a polystyrene resin, a polybutadiene resin, a polyester resin, a polyamide resin, a polyimide resin, a polycarbonate resin, a 1,2-polybutadiene resin, a polycarbonate resin, and a polyimide resin. Of these, a vinyl chloride resin is preferably used because formability at low temperatures and dispersibility of the heat storage material are readily obtained.

In one or more embodiments where a vinyl chloride resin is used, it is preferred that a sol cast film is formed using the heat-storage composition using vinyl chloride resin particles because a heat storage sheet can be formed at low temperatures. The heat-storage composition is a composition in a paste state, which has a heat storage material dispersed or suspended in a resin composition containing vinyl chloride resin particles and a plasticizer.

The vinyl chloride resin particles of one or more embodiments preferably have an average particle diameter of 0.01 to 10 μm, preferably 0.1 to 5 μm. In the heat-storage composition, the vinyl chloride resin particles may be in a state in which the particles are directly dispersed in the composition, or may be in a state in which the particles as primary particles suffer aggregation to form spherical secondary particles and the secondary particles are dispersed in the composition. Alternatively, the vinyl chloride resin particles may be a mixture of particles having different particle diameters and having two or more peaks of the particle size distribution. The particle diameter can be measured by a laser method or the like.

The shape of the vinyl chloride resin particles used in the heat-storage composition of one or more embodiments is preferably a substantially spherical shape because advantageous fluidity is readily obtained and a change of the aged viscosity is small. With respect to the vinyl chloride resin particles, those which are produced by emulsion polymerization or suspension polymerization are preferred because the particles of a spherical shape can be easily obtained and it is easy to control the particle size distribution of the particles.

In one or more embodiments, the polymerization degree of the vinyl chloride resin used is preferably 500 to 4,000, more preferably 600 to 2,000. Further, when the polymerization degree is in the above range, it is easy to adjust the viscosity measured by a rotational viscometer and the steady shear viscosity to those in the respective preferred ranges in one or more embodiments of the present invention.

With respect to the vinyl chloride resin particles used in one or more embodiments of the present invention, commercially available vinyl chloride resin particles can be appropriately used, and, for example, there can be mentioned ZEST PQ83, PWLT, PQ92, P24Z, and the like, manufactured by Shin Dai-ichi Vinyl Corporation, and PSL-675, 685, and the like, manufactured by Kaneka Corporation.

In one or more embodiments where a thermoplastic resin is used as a resin forming a heat storage sheet, the content of the thermoplastic resin is preferably 10 to 80% by mass, more preferably 20 to 70% by mass, further preferably 30 to 60% by mass. When the content of the thermoplastic resin is in the above range, the resin matrix in the sheet can be advantageously formed, facilitating the formation of a sheet having flexibility and toughness. Further, when the content of the thermoplastic resin is in the above range, it is easy to adjust the storage elastic modulus to a value in the range in one or more embodiments of the present invention.

[Plasticizer]

When a thermoplastic resin is used as the resin used in the heat storage sheet of one or more embodiments of the present invention, from the viewpoint of easily securing excellent application properties and film forming properties, it is preferred to use a plasticizer and the thermoplastic resin in combination. With respect to the plasticizer, an epoxy plasticizer, a methacrylate plasticizer, a polyester plasticizer, a polyether ester plasticizer, an aliphatic diester, plasticizer, a trimellitic acid plasticizer, an adipic acid plasticizer, a benzoic acid plasticizer, a phthalic acid plasticizer, or the like can be appropriately used. Two or more types of plasticizers may be used appropriately in combination. When the heat storage sheet is used in the application of building materials for houses and the like and the application of automobiles and the like, it is preferred to use a non-phthalic acid plasticizer other than the phthalic acid plasticizers which could adversely affect a human body.

With respect to the plasticizer of one or more embodiments, various types of plasticizers which are commercially available can be appropriately used, and examples of epoxy plasticizers include Monocizer W-150, manufactured by DIC Corporation; SANSO CIZER E-PS, E-PO, E-4030, E-6000, E-2000H, E-9000H, manufactured by New Japan Chemical Co., Ltd.; ADK CIZER O-130P, O-180A, D-32, D-55, manufactured by ADEKA Corporation; and KAPDX S-6, manufactured by Kao Corporation, examples of polyester plasticizers include Polycizer W-2050, W-2310, W-230H, manufactured by DIC Corporation; ADK CIZER PN-7160, PN-160, PN-9302, PN-150, PN-170, PN-230, PN-7230, PN-1010, manufacturedbyADEKACorporation; D620, D621, D623, D643, D645, D620N, manufactured by Mitsubishi Chemical Corporation; and HA-5, manufactured by Kao Corporation, examples of trimellitic acid plasticizers include Monocizer W-705, manufactured by DIC Corporation; ADKCIZERC-9N, manufactured by ADEKA Corporation; and TOTM, TOTM-NB, manufactured by Mitsubishi Chemical Corporation, and examples of benzoic acid plasticizers include Monocizer PB-3A, manufactured by DIC Corporation; and JP120, manufactured by Mitsubishi Chemical Corporation.

In one or more embodiments of the present invention, among the above-mentioned plasticizers, a plasticizer capable of being gelled at low temperatures can be especially preferably used because it is easy to prevent the heat storage material or plasticizer from oozing. The plasticizer preferably has a gelation end-point temperature of 150° C. or lower, more preferably 140° C. or lower, further preferably 130° C. or lower, further preferably 120° C. or lower, especially preferably 110° C. or lower. With respect to the gelation end-point temperature, a temperature at which the light transmission properties of the gelled film become constant can be determined as a gelation end-point temperature. Examples of the plasticizers having excellent low-temperature formability include an epoxy plasticizer, a polyester plasticizer, and a benzoic acid plasticizer. These plasticizers having excellent low-temperature formability are preferred because advantageous heat storage properties as well as toughness of the resin matrix can be especially easily obtained. Further, from the viewpoint of the heat resistance and low-temperature formability, an epoxy plasticizer and a polyester plasticizer can be especially preferably used.

The gelation end-point temperature is specifically determined as follows. A composition having a vinyl chloride resin for paste (degree of polymerization: 1,700), the plasticizer, and a heat stabilizer (Ca—Zn) mixed in a mass ratio of 100/80/1.5 is placed between a glass plate and a prepared slide, and the temperature is increased at a temperature increase rate of 5° C./min, and a change of the light transmission properties is observed using a hot stage for microscopic examination (Metter 800), and a temperature at which the light transmission properties of the composition become constant is determined as a gelation end-point temperature.

The plasticizer used in one or more embodiments of the present invention preferably has a viscosity at 25° C. of 1,500 millipascal seconds (mPa·s) or less, more preferably 1,000 mPa·s or less, further preferably 500 mPa·s or less, especially preferably 300 mPa·s or less. When the viscosity of the plasticizer is in the above range, the viscosity of the heat-storage composition can be suppressed to be low, making it possible to increase the filling ratio of the heat storage material. Further, when the viscosity of the plasticizer is in the above range, it is easy to adjust the viscosity measured by a rotational viscometer and the steady shear viscosity to those in the respective preferred ranges in one or more embodiments of the present invention. With respect to the conditions for the plasticizer viscosity measurement, the measurement can be made under the conditions employed in the below-mentioned Examples.

The plasticizer used in one or more embodiments of the present invention preferably has a weight average molecular weight of 200 to 3,000, more preferably 300 to 1,000. When the weight average molecular weight of the plasticizer is in the above range, the plasticizer per se is unlikely to ooze out of the composition and the viscosity of the heat-storage composition can be suppressed to be low, making it possible to increase the filling ratio of the heat storage material. Further, when the weight average molecular weight of the plasticizer is in the above range, it is easy to adjust the viscosity measured by a rotational viscometer and the steady shear viscosity to those in the preferred ranges in one or more embodiments of the present invention. The weight average molecular weight (Mw) is a value measured by gel permeation chromatography (hereinafter, abbreviated to "GPC") using a calibration curve obtained with respect to polystyrene. The GPC measurement can be conducted under the conditions shown below.

<Conditions for Measurement of a Weight Average Molecular Weight>
Measuring apparatus: Guard column "HLC-8330", manufactured by Tosoh Corp.
Columns: "TSK SuperH-H", manufactured by Tosoh Corp.
+"TSK gel SuperHZM-M", manufactured by Tosoh Corp.
+"TSK gel SuperHZM-M", manufactured by Tosoh Corp.
+"TSK gel SuperHZ-2000", manufactured by Tosoh Corp.
+"TSK gel SuperHZ-2000", manufactured by Tosoh Corp.
Detector: RI (Differential refractometer)
Data processing: "GPC-8020 Model II Version 4.10", manufactured by Tosoh Corp.
Column temperature: 40° C.
Developing solvent: Tetrahydrofuran (THF)
Flow rate: 0.35 mL/minute
Sample: A 1.0% by mass tetrahydrofuran solution, in terms of a resin solids content, which has been subjected to filtration using a microfilter (100 μl)
Standard sample: In accordance with the measurement manual of the above-mentioned "GPC-8020 Model II Version 4.10", the monomodal polystyrenes having known molecular weights shown below were used.
<Standard Sample: Monomodal Polystyrenes>
"A-300", manufactured by Tosoh Corp.
"A-500", manufactured by Tosoh Corp.
"A-1000", manufactured by Tosoh Corp.
"A-2500", manufactured by Tosoh Corp.
"A-5000", manufactured by Tosoh Corp.
"F-1", manufactured by Tosoh Corp.
"F-2", manufactured by Tosoh Corp.
"F-4", manufactured by Tosoh Corp.
"F-10", manufactured by Tosoh Corp.
"F-20", manufactured by Tosoh Corp.
"F-40", manufactured by Tosoh Corp.
"F-80", manufactured by Tosoh Corp.
"F-128", manufactured by Tosoh Corp.
"F-288", manufactured by Tosoh Corp.

When the heat storage material used in one or more embodiments of the present invention is a heat storage material in the form of microcapsules containing the heat storage material in a resin outer shell, among the above plasticizers, it is preferred to use a plasticizer such that an HSP distance between the heat storage material used and the plasticizer is 6 or more. By using the plasticizer, elimination of an eliminating component from the heat storage sheet at high temperatures can be suppressed, facilitating achievement of advantageous heat resistance such that volume shrinkage is unlikely to occur even at high temperatures. In a formed article comprising a resin composition containing a general thermoplastic resin and plasticizer and containing no heat storage material, large volume shrinkage is unlikely to occur even at high temperatures. However, in a heat storage sheet containing a heat storage material, large volume shrinkage likely occurs at high temperatures. In one or more embodiments of the present invention, when the HSP distance between the heat storage material and the plasticizer is in the above range, incorporation of the plasticizer, which causes an eliminating component in a large amount at high temperatures, into the heat storage material is suppressed, so that the occurrence of volume shrinkage at high temperatures is more likely to be suppressed, facilitating achievement of advantageous heat resistance. From the viewpoint of easily obtaining advantageous heat resistance, the HSP distance is preferably 7 or more, more preferably 8 or more. With respect to the upper limit of the HSP distance, there is no particular limitation as long as the plasticizer is generally used as a plasticizer, but, from the viewpoint of easily obtaining advantageous compatibility and formability, the HSP distance is preferably 40 or less, more preferably 30 or less, further preferably 25 or less.

The HSP distance is an index indicating the solubility between substances using a Hansen solubility parameter (HSP). The Hansen solubility parameter indicates solubility using a multi-dimensional (typically three-dimensional) vector, and the vector can be represented using a dispersion term, a polar term, and a hydrogen bond term. The degree of similarity of the vector is indicated by a distance between the Hansen solubility parameters (HSP distance).

With respect to the Hansen solubility parameter, values for reference are shown in various documents, and, for example, there can be mentioned Hansen Solubility Parameters: A User's Handbook (Charles Hansen et. al., 2007, the 2nd edition) and the like. Alternatively, using commercially available software, for example, using Hansen Solubility Parameter in Practice (HSPiP), a Hansen solubility parameter can be determined based on the chemical structure of a substance. The determination is made for a solvent temperature of 25° C.

With respect to a preferred combination of the plasticizer and the heat storage material of one or more embodiments, for example, when the heat storage material having an acrylic outer shell is used, an epoxy plasticizer, a polyester plasticizer, a trimellitic acid plasticizer, or the like can be preferably used. When the heat storage material having a melamine outer shell is used, an epoxy plasticizer, a polyester plasticizer, a trimellitic acid plasticizer, a benzoic acid plasticizer, or the like can be preferably used. Especially an epoxy plasticizer is preferred because various properties, such as a heat resistance, can be advantageously obtained.

Further, in one or more embodiments of the present invention, from the viewpoint of advantageously constituting the resin matrix of a formed article, the HSP distance between the thermoplastic resin and the plasticizer used is preferably 15 or less, more preferably 12 or less. The lower limit of the HSP distance is not particularly limited, but is preferably 1 or more, more preferably 2 or more, further preferably 3 or more.

In one or more embodiments where the heat storage material in the form of microcapsules containing the heat storage material in a resin outer shell is used, there can be preferably used a plasticizer such that, when the plasticizer is mixed into the heat storage material used, an absorption of the plasticizer into 100 parts by mass of the heat storage material is 150 parts by mass or less, as measured in accordance with JIS K5101-13-1. By using the plasticizer, elimination of an eliminating component from the heat storage sheet at high temperatures can be suppressed, enabling achievement of advantageous heat resistance such that volume shrinkage is unlikely to occur even at high temperatures. From the viewpoint of readily obtaining advantageous heat resistance, the absorption of the plasticizer is preferably 140 parts by mass or less, more preferably 135 parts by mass or less, further preferably 130 parts by mass or less. With respect to the lower limit of the absorption of the plasticizer, there is no particular limitation as long as the plasticizer is generally used as a plasticizer, but, from the viewpoint of easily obtaining advantageous compatibility and formability, the absorption of the plasticizer is preferably 5% by mass or more, more preferably 10% by mass or more. Further, when the absorption of the plasticizer is in the above range, it is easy to adjust the storage elastic modulus of the composition to a value in the preferred range in one or more embodiments of the present invention.

The absorption of the plasticizer of one or more embodiments is measured by the method for measuring an oil absorption in accordance with JIS K5101-13-1. Specifically, a sample obtained by weighing 1 to 20 g of a heat storage material according to the expected absorption is placed on a glass plate, and a plasticizer is dropwise added to the sample from a burette so that 4 to 5 droplets of the plasticizer are added at a time. After each addition, the plasticizer is kneaded into the sample using a palette knife made of steel. This is repeated and the dropwise addition of the plasticizer is continued until a solid mass of the plasticizer and sample is formed. Thereafter, one droplet of the plasticizer is added at a time and completely kneaded into the mass, and this is repeated, and a point in time when the mass has become a smooth paste is determined as an end point, and the absorption at the end point is taken as an absorption of the plasticizer. The paste is such smooth that the paste can be spread without being cracked or crumbling into small pieces and lightly adheres to a measuring plate.

The content of the plasticizer in the heat storage sheet of one or more embodiments is preferably 5 to 75% by mass, more preferably 10 to 70% by mass, further preferably 20 to 60% by mass, especially preferably 20 to 40% by mass. When the content of the plasticizer is in the above range, excellent application properties and formability can be readily obtained. With respect to the proportion of the contained plasticizer to the thermoplastic resin, from the viewpoint of easily adjusting the viscosity of the composition to a value in the range in one or more embodiments of the present invention, the amount of the plasticizer, relative to 100 parts by mass of the thermoplastic resin, is preferably 30 to 150 parts by mass, more preferably 40 to 130 parts by mass, further preferably 50 to 120 parts by mass.

[Heat Storage Material]

With respect to the heat storage material of one or more embodiments, there is no particular limitation as long as it has heat storage properties, and there can be used a heat storage material of a latent heat type, a heat storage material of a sensible heat type, and a heat storage material of a chemical reaction type utilizing absorption of heat or generation of heat caused due to a chemical reaction. Of these, a heat storage material of a latent heat type is preferred because the material with a small volume readily secures a large amount of energy, and it is easy to control the heat absorption or radiation temperature of the material.

With respect to the heat storage material of a latent heat type (phase change material) of one or more embodiments, taking into consideration the potential oozing of the material during melting due to a phase change and the like and the dispersibility of the material upon mixing, preferred are heat storage particles in the form of capsules having a phase change material, such as a paraffin, contained in an outer shell made of an organic material or the like. In one or more embodiments of the present invention, when the heat storage particles having an outer shell are used, the HSP distance is calculated based on the HSP of the material used in the outer shell of the heat storage particles. In the heat storage sheet of one or more embodiments of the present invention, even when the heat storage material containing a phase change material, such as a paraffin, in an outer shell made of an organic material is used, the outer shell is unlikely to suffer embrittlement due to a plasticizer, so that the heat storage material is unlikely to be damaged.

With respect to the heat storage particles of one or more embodiments, examples of those using an outer shell made of a melamine resin include Thermo Memory FP-16, FP-25, FP-27, FP-31, FP-39, manufactured by Mitsubishi Paper Mills Limited, and RIKEN-RESIN PMCD-15SP, 25SP, 32SP, manufactured by Mikiriken Industrial Co., Ltd. Examples of heat storage particles using an outer shell made of silica include RIKEN-RESIN LA-15, LA-25, LA-32, manufactured by Mikiriken Industrial Co., Ltd., and examples of heat storage particles using an outer shell made of a polymethyl methacrylate resin include Micronal DS5001X, 5040X, manufactured by BASF AG.

The particle diameter of the heat storage particles of one or more embodiments is preferably about 10 to 1,000 μm, more preferably 50 to 500 μm. With respect to the particle diameter of the heat storage particles, it is preferred that the particle diameter of the primary particles is in the above range, but it is also preferred that the heat storage particles having a primary particle diameter of 1 to 50 μm, preferably 2 to 10 μm suffer aggregation to form secondary particles, and the particle diameter of the secondary particles is in the above range. By using the above-mentioned heat storage particles, it is easy to adjust the storage elastic modulus to a value in the range in one or more embodiments of the present invention, and, particularly, the secondary particle diameter of the heat storage particles is preferably 500 μm or less, more preferably 300 μm or less, especially preferably 100 μm or less.

Such heat storage particles are easily damaged due to a pressure or a shear, but, by virtue of having the construction in one or more embodiments of the present invention, a damage of the heat storage particles can be advantageously suppressed, so that oozing or leakage of the heat storage material from the particles is unlikely to occur. Especially when the outer shell is formed from an organic material, there is a fear that the particles are damaged due to temperatures. However, the heat storage sheet of one or more embodiments of the present invention is advantageous in that even when using the phase change material having such an outer shell, oozing or leakage of the heat storage material can be advantageously suppressed. All the heat storage particles used in the heat storage sheet do not necessarily have a particle diameter in the above-mentioned range, and preferably 80% by mass or more of, more preferably 90% by mass or more of, especially preferably 95% by mass or more of the heat storage particles in the heat storage sheet are the heat storage particles having a particle diameter in the above-mentioned range.

In one or more embodiments, the phase change material undergoes a phase change at the melting point thereof which is a specific temperature. Specifically, when the room temperature is higher than the melting point, the phase change material undergoes a phase change from solid to liquid, and, when the room temperature is lower than the melting point, the phase change material undergoes a phase change from liquid to solid. The melting point of the phase change material may be controlled according to the mode of the use thereof, and the phase change material which exhibits solid/liquid phase transition at a temperature in the range of from about −20 to 120° C. can be appropriately used. For example, when the temperature in housing spaces of houses and the like or interior spaces of automobiles, electric trains, aircraft, agricultural hothouses and the like is maintained at an appropriate temperature in an attempt to save energy, appropriate temperature maintaining performance can be exhibited by mixing the phase change material having a melting point designed to a temperature suitable for everyday life, specifically 10 to 35° C., preferably 15 to 30° C. More specifically, in the case of controlling the appropriate temperature maintaining performance in the season of winter or summer, for the purpose of maintaining the heating effect in the winter, the phase change material preferably having a melting point of about 18 to 28° C., more preferably about 18 to 23° C. is mixed, and, for the purpose of suppressing the temperature rise in the summer, the phase change material preferably having a melting point of about 20 to 30° C., more preferably about 25 to 30° C. is mixed. For achieving both effects, two or more types of the phase change materials having different melting points designed may be mixed. When an attempt is made to save energy for the inside of a refrigerator of refrigeration equipment or the like, the phase change material having a melting point of about −10 to 5° C. may be used.

The heat storage material used in one or more embodiments of the present invention preferably has a water content of 3% by mass or less, more preferably 2.0% by mass or less, further preferably 1.5% by mass or less, especially preferably 1.2% by mass or less. When the water content of the heat storage material during the preparation of the heat-storage composition is in the above range, formation of a very small blister or depression in the obtained heat storage sheet can be easily suppressed, making it easy to obtain a heat storage sheet having advantageous appearance.

In one or more embodiments, the content of the heat storage material in the heat storage sheet is preferably 10 to 80% by mass, more preferably 20 to 70% by mass, further preferably 30 to 60% by mass. When the content of the heat storage material is in the above range, excellent heat storage effect and formability can be readily obtained. Further, when the content of the heat storage material is 10% by mass or more, it is easy to adjust the composition viscosity and the storage elastic modulus to those in the respective ranges in one or more embodiments of the present invention.

[Heat-Storage Composition]

The heat-storage composition of one or more embodiments of the present invention is a heat-storage composition having a viscosity of 100 to 1,000 dPa·s, as measured by a cylinder-type rotational viscometer (Viscotester). By virtue of having the above-mentioned viscosity, the heat-storage composition enables advantageous thick film formation, and exhibits excellent form retention properties in the thick film application. The viscosity is preferably 120 dPa·s or more, more preferably 150 dPa·s or more. The upper limit of the viscosity is more preferably 800 dPa·s or less, further preferably 600 dPa·s or less, especially preferably 500 dPa·s or less.

In one or more embodiments, the viscosity can be measured under the conditions shown below.
Measuring apparatus: Viscotester VT-04 (manufactured by Rion Co., Ltd.)
Conditions for measurement: temperature: 25° C., No. 2 rotor (62.5 rpm)

Further, in one or more embodiments of the present invention, the steady shear viscosity at a shear rate of 10 [1/s] is preferably 50 Pa·s or less, more preferably 30 Pa·s or less. When the steady shear viscosity is in the above range, advantageous fluidity of the heat-storage composition during the application can be easily obtained, facilitating improvement of the application properties.

The steady shear viscosity is a steady shear viscosity at a shear rate in the range of from 0.1 to 700 [1/s] measured under conditions at a temperature of 25° C. in accordance with JIS K 7117-2. Specifically, the steady shear viscosity is measured by means of rotational Rheometer MCR102, manufactured by Anton Paar GmbH, using parallel plate PP50 (diameter: 50 mm).

A sample to be used in the measurement is homogeneously dispersed using Homogenizing Disper at about 500 rpm for 2 minutes to obtain a measurement sample. It is also preferred that about 2 g of the composition to be measured is placed on a specimen carrier of a rheometer and a parallel plate for measurement is brought downwards so that the composition is sandwiched with a gap of about 1.1 to 1.3 mm, and pre-shear is preliminarily applied to the sandwiched sample in order to make equal the states of the all samples before subjected to main measurement, followed by the main measurement. Conditions for pre-shear are, for example, such that the shear rate is 10 [1/s] and the application time is 60 [sec].

The heat-storage composition of one or more embodiments of the present invention is a heat-storage composition having a storage elastic modulus (G') of 3 Pa or more at 1 [rad/s], as measured by dynamic viscoelasticity measurement at a temperature of 25° C. and at a strain of 0.1%. The storage elastic modulus (G') of the heat-storage composition is in the above range, and therefore the occurrence of slump during the thick film application can be advantageously suppressed, enabling formation of an excellent coating film having an increased thickness. The storage elastic modulus (G') is preferably 5 Pa or more, more preferably 8 Pa or more. The upper limit of the storage elastic modulus (G') is not particularly limited, but is preferably 200 Pa or less, more preferably 150 Pa or less.

Further, in one or more embodiments it is preferred that the heat-storage composition has a loss elastic modulus (G") of 10 Pa or more measured as mentioned above at 1 [rad/s]. The upper limit of the loss elastic modulus (G") is preferably 200 Pa or less, more preferably 150 Pa or less. When the loss elastic modulus (G") of the heat-storage composition is in the above range, advantageous form retention properties and application properties can be readily obtained during the thick film application.

When the heat-storage composition of one or more embodiments of the present invention has a loss tangent (tan δ) of 3 or less at an angular frequency of 1 [rad/s], as measured by dynamic viscoelasticity measurement, excellent form retention properties can be achieved during the thick film application, and the occurrence of slump can be advantageously suppressed, and therefore a thick sheet can be easily formed by application. The loss tangent is more preferably 2 or less, further preferably 1.5 or less. Further, the loss tangent is preferably 0.3 or more, more preferably 0.5 or more.

The dynamic viscoelasticity is a dynamic viscoelasticity measured at an angular frequency of 0.3 to 100 rad/s under conditions at a temperature of 25° C. and at a strain of 0.1% in accordance with JIS K 7244-10. Specifically, the dynamic viscoelasticity is measured by means of rotational Rheometer MCR102, manufactured by Anton Paar GmbH, using parallel plate PP50 (diameter: 50 mm).

In one or more embodiments, a sample to be used in the measurement is homogeneously dispersed using Homogenizing Disper at about 500 rpm for 2 minutes to obtain a measurement sample. It is also preferred that the components for the composition to be measured are mixed and the resultant composition is allowed to stand for one hour, and then about 2 g of the composition is placed on a specimen carrier of a rheometer and a parallel plate for measurement is brought downwards so that the composition is sandwiched with a gap of about 1.1 to 1.3 mm, and pre-shear is preliminarily applied to the sandwiched sample in order to make equal the states of the all samples before subjected to main measurement, followed by the main measurement. Conditions for pre-shear are, for example, such that the shear rate is 10 [1/s] and the application time is 60 [sec].

The heat-storage composition of one or more embodiments of the present invention is prepared by blending together the above-mentioned resin component and heat storage material. For example, when a vinyl chloride resin is used as the thermoplastic resin, a method is preferred in which, using a vinyl sol coating liquid using vinyl chloride resin particles as the heat-storage composition, a heat storage layer is formed by sol casting. By employing the above production method, forming can be made without kneading using a mixer or the like, extrusion, or the like, and thus the heat storage material is unlikely to suffer breakage, so that the heat storage material is unlikely to ooze out of the obtained heat storage sheet. Further, by using the above method, forming at low temperatures is readily made, and therefore breakage of the heat storage material due to heat can be suppressed, and thus the method can be especially preferably used.

When a vinyl sol coating liquid using a vinyl chloride resin is used as the heat-storage composition of one or more embodiments, the amount of the vinyl chloride resin contained is preferably 10 to 80% by mass, more preferably 20 to 70% by mass, further preferably 30 to 60% by mass, based on the mass of the solids contained in the heat-storage composition (components other than the solvent). The amount of the plasticizer contained, relative to 100 parts by mass of the thermoplastic resin contained in the composition, is preferably 30 to 150 parts by mass, more preferably 30 to 120 parts by mass, further preferably 40 to 100 parts by mass. Further, the amount of the contained heat storage material mixed into the composition is preferably 10 to 80% by mass, more preferably 20 to 70% by mass, further preferably 30 to 60% by mass, based on the mass of the solids contained in the composition.

In the heat-storage composition of one or more embodiments, an appropriate solvent can be used. As the solvent, the solvent used in the sol casting method for vinyl chloride resin can be appropriately used, and, especially, preferred examples of solvents include ketones, such as diisobutyl ketone and methyl isobutyl ketone, esters, such as butyl acetate, and glycol ethers. These solvents are preferred because they likely slightly swell the resin at room temperature to help dispersion and likely promote melting or gelation of the resin in the heating step. These solvents may be used individually or in combination.

In one or more embodiments, a diluent solvent may be used together with the above solvent. As the diluent solvent, a solvent which does not dissolve the resin and suppresses the swelling properties of the dispersing solvent can be preferably used. As such a diluent solvent, for example, a paraffin hydrocarbon, a naphthene hydrocarbon, an aromatic hydrocarbon, a terpene hydrocarbon, or the like can be used.

In the heat-storage composition of one or more embodiments, for suppressing decomposition or deterioration, or discoloration caused mainly due to a dehydrochlorination reaction of the vinyl chloride resin, a heat stabilizer is preferably used. As the heat stabilizer, for example, a calcium/zinc stabilizer, an octyltin stabilizer, a barium/zinc stabilizer, or the like can be used. The amount of the heat stabilizer contained is preferably 0.5 to 10 parts by mass, relative to 100 parts by mass of the vinyl chloride resin.

The heat-storage composition of one or more embodiments may appropriately contain, if necessary, as a component other than those mentioned above, an additive, such as a viscosity depressant, a dispersant, or an anti-foaming agent. The amount of each additive contained is preferably 0.5 to 10 parts by mass, relative to 100 parts by mass of the vinyl chloride resin.

With respect to the heat storage sheet comprising a sol cast film of the heat-storage composition containing the vinyl chloride resin particles and the heat storage material of one or more embodiments, a shear or pressure is not applied to the heat storage material during the production of the sheet, and therefore the heat storage material is unlikely to suffer breakage. Thus, despite the use of a resin material, the heat storage material is unlikely to ooze out of the sheet. Further, by virtue of having the heat storage material, the heat storage sheet has heat storage properties, and further can realize excellent flexibility. Furthermore, the heat storage sheet can be easily laminated on another layer or processed, and therefore can be used in various applications or modes.

[Heat Storage Sheet]

The heat-storage composition of one or more embodiments of the present invention is applied or charged into a frame in an arbitrary form, and then heated or dried, thus forming a heat storage sheet. An example of a preferred production method is a method in which the resin composition containing a resin and a heat storage material is prepared, and the composition is applied onto a support to form a coating film, and then the coating film is heated at such a temperature that the coating film temperature becomes 150° C. or lower to form a heat storage sheet.

With respect to the support used in one or more embodiments, when the heat storage sheet is peeled off the support and circulated, used, or the like, a support from which the obtained heat storage sheet can be peeled, and which has a heat resistance at a temperature for the heating step can be appropriately used. When the heat storage sheet is used in the form of being laminated on another functional layer or substrate, the functional layer or substrate may be used as a support.

When the heat storage sheet is peeled off a support, for example, a resin film used as a film for various steps can be preferably used as a support. Examples of the resin films include polyester resin films, such as a polyethylene terephthalate resin film and a polybutylene terephthalate resin film. With respect to the thickness of the resin film, there is no particular limitation, but the resin film having a thickness of about 25 to 100 µm is easy to handle and is readily available.

With respect to the resin film used as a support, one having a surface which has been subjected to release treatment can be preferably used. Examples of release treatment agents used in the release treatment include an alkyd resin, an urethane resin, an olefin resin, and a silicone resin.

In a cast film forming method in which the heat-storage composition is applied, a coating machine, such as a roll knife coater, a reverse-roll coater, or a comma coater, can be used. Especially, there can be preferably used a method in which the heat-storage resin composition is fed onto a support to form a coating film having a predetermined thickness using a doctor knife or the like.

In one or more embodiments, the obtained coating film is gelled or cured by heating or drying to form a sheet. The heating temperature is preferably such that the coating film temperature becomes 150° C. or lower, more preferably 140° C. or lower, further preferably 130° C. or lower, further preferably 120° C. or lower. By adjusting the coating film temperature to the above-mentioned temperature, breakage of the heat storage material due to heat can be advantageously suppressed. The heating time may be appropriately controlled according to the gelation rate or the like, but the heating time may be adjusted to about 10 seconds to 10 minutes. The heating and drying, such as air-drying, may be appropriately employed in combination.

When a solvent is used in the heat-storage composition of one or more embodiments, removal of the solvent may be simultaneously performed in the heating step, but it is also preferred that predrying is performed prior to the heating.

The above-formed heat storage sheet is subjected to a step in which the heat storage sheet is peeled off the support, and thus can be used as a heat storage sheet. The peeling may be appropriately conducted by an advantageous method. The heat storage sheet can be circulated in the state of being laminated on the support when the state of being laminated on the support is advantageous to various processing or lamination of the sheet.

In one or more embodiments, the thickness of the heat tstorage sheet may be appropriately controlled according to the mode of the use thereof. For example, when applied to walls for a closed space and the like, from the viewpoint of readily obtaining advantageous heat storage effect, the thickness of the heat storage sheet is preferably 100 µm or more, more preferably 500 µm or more, further 1 mm or more, especially preferably 3 mm or more. With respect to the upper limit of the thickness, there is no particular limitation, but, when the organic heat storage layer is handled in an independent form, for example, when the organic heat storage layer in a sheet form is formed and then put on the inorganic substrate, from the viewpoint of readily obtaining advantageous flexibility and handling properties, the heat storage sheet is formed with a thickness of preferably 20 mm or less, more preferably 10 mm or less, further preferably 6 mm or less. Even when the heat storage sheet in one or more embodiments of the present invention has a thickness of, for example, 500 µm or more, or a thickness as large as 1 mm or more, a crack or a defect is unlikely to be caused in the sheet being processed or carried, making it possible to realize excellent processability and handling properties.

[Heat Storage Laminate]

It is preferred that the heat storage sheet in one or more embodiments of the present invention is laminated on various types of functional layers to form a heat storage laminate. For example, when the heat storage sheet is laminated on an incombustible layer, such as incombustible paper or an incombustible substrate, it is possible to improve the flame retardancy, and the resultant laminate is especially preferably applied to housing spaces. Further, for example, when the heat storage sheet is laminated on a thermal diffusion layer or a heat insulating layer, the resultant laminate can more effectively exhibit heat storage properties. For applying the heat storage sheet to inner walls and the like for housing spaces, a patterned layer or a decorative layer can be formed on the heat storage sheet.

With respect to the incombustible layer of one or more embodiments, various types of incombustible substrates can be used, and, when the heat storage sheet is laminated on the incombustible substrate, it is possible to impart quasi-incombustibility or incombustibility to the sheet. Examples of the incombustible substrates include inorganic substrates, such as plasterboard, a calcium silicate board, a flexible board, a cement board, and fiber-reinforced boards thereof.

Further, incombustible paper can be used as the incombustible layer of one or more embodiments, and there can be mentioned a construction in which incombustible paper is laminated on one surface or both surfaces of the heat storage sheet in one or more embodiments of the present invention. The construction in which incombustible paper is laminated on one surface of the heat storage sheet may be a construction in which the heat storage sheet in one or more embodiments of the present invention is put on incombustible paper, but a construction in which the composition forming the heat storage sheet in one or more embodiments of the present invention is directly applied onto incombustible paper and subjected to gelation is preferred because the formation of the laminate is easy. The construction in which the heat storage sheet has incombustible paper on both surfaces thereof may be a construction in which incombustible paper is put on both surfaces of the heat storage sheet in one or more embodiments of the present invention, but the laminate can be easily formed by applying the heat-storage composition onto incombustible paper and subjecting the applied composition to gelation, and putting the heat storage sheet surfaces of the resultant incombustible paper laminated heat storage sheets on each other. Further, a construction can be preferably used in which the above-mentioned incombustible substrate is further laminated on the above construction having incombustible paper laminated on one surface or both surfaces of the heat storage sheet.

With respect to the incombustible paper of one or more embodiments, there is no particular limitation as long as it has incombustibility, but, for example, paper having applied thereto, impregnated with, or containing therein a flame retardant can be used. Examples of flame retardants include metal hydroxides, such as magnesium hydroxide and aluminum hydroxide, basic compounds, such as phosphates, borates, and sulfamates, and glass fibers.

In one or more embodiments where the heat storage laminate having a construction in which a thermal diffusion layer is laminated on the heat storage layer is applied to a closed space, such as an interior space, the thermal diffusion layer exhibits an effect that causes the heat inside the interior space to be uniform, and further can disperse the heat from the interior space (e.g., closed spaces, such as housing spaces of houses and the like, interior spaces of automobiles, electric trains, aircraft and the like, the inside of a refrigerator of refrigerator trucks, and the inside of aircraft) to conduct the heat to the heat storage layer with a less thermal resistance. In the heat storage layer, the heat storage particles cause absorption of heat inside the interior space and emission of heat to the interior space, making it possible to control the temperature environment of the interior space to be at an appropriate temperature.

As the thermal diffusion layer of one or more embodiments, a layer having a thermal conductivity as high as 5 to 400 W/m·K can be preferably used. By virtue of high thermal conductivity, the locally concentrated heat is diffused to be conducted to the heat storage layer, making it possible to improve the thermal efficiency and cause the room temperature to be uniform.

Examples of materials for the thermal diffusion layer include aluminum, copper, iron, and graphite. In one or more embodiments of the present invention, particularly, aluminum can be preferably used. The reason why aluminum is preferred is, for example, that aluminum also exhibits a heat insulating effect due to reflection of radiant heat. Particularly, in a heating apparatus using radiant heat, the heat insulating effect can improve the heating efficiency. As examples of heating apparatuses mainly using radiant heat, there can be mentioned electric floor heating, hot-water type floor heating, and an infrared heater. Also from the viewpoint of preventing disasters, it is possible to improve the flame retardancy performance.

With respect to the form of the thermal diffusion layer of one or more embodiments, an appropriate form of a layer made of a sheet of the above-mentioned material, a deposited layer of the above material, or the like can be used. When aluminum is used as a material for the thermal diffusion layer, for example, a thermal diffusion layer having stretchability, such as an aluminum foil or an aluminum deposited layer, can be preferably used.

With respect to the thickness of the thermal diffusion layer of one or more embodiments, there is no particular limitation, but the thermal diffusion layer preferably has a thickness of about 3 to 500 μm because it is easy to secure advantageous thermal diffusion properties and handling properties.

In one or more embodiments where the heat storage laminate has a construction in which a heat insulating layer is laminated on the heat storage layer, the heat storage layer effectively performs absorption of heat and emission of heat on the interior space side, so that the appropriate temperature maintaining effect for the interior space can be especially advantageously exhibited. Further, this construction is also effective in preventing the heat in the interior space from flowing out, or reducing the effect of the heat from the outside air. Utilizing a combination of these effects, the heat storage laminate in one or more embodiments of the present invention can suppress a change of the temperature in the interior space to retain the interior space at an appropriate temperature. Further, when an air-conditioning apparatus, such as an air-conditioner or refrigeration equipment, is used, it is possible to reduce the energy consumption of the apparatus. Thus, the heat storage laminate can advantageously contribute to energy savings for interior spaces.

As the heat insulating layer of one or more embodiments, a layer having a thermal conductivity of less than 0.1 W/m·K can be preferably used. The heat insulating layer exhibits an effect such that the heat is prevented from flowing out of the heat storage layer to the outside air and further the effect of the outside air on the temperature is reduced. With respect to the heat insulating layer, there is no particular limitation as long as it can form a layer having a thermal conductivity of less than 0.1 W/m·K, and, for example, a heat insulating sheet, such as a foamed resin sheet, or a resin sheet containing a heat insulating material, or a heat insulating board, such as extrusion method polystyrene, bead method polystyrene, a polyethylene foam, an urethane foam, or a phenol foam, can be appropriately used. Especially, a heat insulating sheet is preferred because it is easy to secure working properties, and a resin sheet containing a heat insulating material is more preferred because the thermal conductivity can be reduced. Further, a foamed sheet is preferred because it is readily available and inexpensive.

When the heat insulating layer is in a sheet form, it is easy to secure working properties, and, especially, it is preferred that a measured value of the heat insulating layer using a cylindrical mandrel flex testing machine (JIS K 5600) is 2 to 32 mm, in terms of a mandrel diameter.

The heat insulating material used in the heat insulating layer improves the heat insulating properties of the heat storage laminate, and examples of heat insulating materials include porous silica, porous acryl, hollow glass beads, vacuum beads, and hollow fibers. As the heat insulating material 5, a known heat insulating material may be used. In one or more embodiments of the present invention, particularly, porous acryl can be preferably used. The particle diameter of the heat insulating material is not limited, but is preferably about 1 to 300 μm.

When a resin sheet containing a heat insulating material is used as the heat insulating layer, the heat insulating material is mixed into a resin material as a base and subjected to sheet forming. Examples of resin materials include, as mentioned above, polyvinyl chloride, polyphenylene sulfide, polypropylene, polyethylene, polyester, and an acrylonitrile-butadiene-styrene resin. As polyester, A-PET, PET-G, or the like can be used. Of these, from the viewpoint of low combustibility upon a fire, a vinyl chloride resin having self-extinguishing properties can be preferably used.

As a sheet forming method of one or more embodiments, for example, a vinyl chloride resin, a plasticizer, and a heat insulating material are subjected to sheet forming using a forming machine for extrusion, calendering, or the like.

In one or more embodiments, the content of the heat insulating material in the heat insulating layer is preferably 20% by mass or more, more preferably 20 to 80% by mass, further preferably 30 to 80% by mass, especially preferably 40 to 80% by mass, based on the mass of the heat insulating layer. When the content of the heat insulating material is in the above range, the heat insulating effect can be advantageously exhibited, and the formation of the heat insulating layer is facilitated.

In the heat insulating layer of one or more embodiments, if necessary, an additive, such as a plasticizer or a flame retardant, may be incorporated.

With respect to the thickness of the heat insulating layer of one or more embodiments, there is no particular limitation, but the larger the thickness, the more excellent the heat retaining properties for interior spaces the heat insulating layer exhibits. For securing the stretchability or working properties of the sheet, the thickness of the heat insulating layer is preferably about 50 to 3,000 μm.

The heat storage sheet formed from the heat-storage composition of one or more embodiments of the present invention is advantageously used mainly in the interior material application for inner walls, ceilings, floors, and the like of buildings, but can be applied to coating materials for sash window frame and interior trims for vehicles and the like. Further, the heat storage sheet can be used not only in walls, floors, and ceilings of buildings but also in interior spaces of automobiles, electric trains, aircraft and the like. Furthermore, the heat storage sheet can be used as a low-temperature retaining material for refrigeration equipment, or a low-temperature maintaining material for electric parts which generate heat, e.g., a CPU and a storage battery for personal computer. The heat storage sheet and a heater, such as a heating element in a plane form, may be used in combination to exhibit an energy saving effect due to heat storage.

EXAMPLES

Example 1

100 Parts by mass of polyvinyl chloride resin particles having a polymerization degree of 900 (ZEST PQ92, manufactured by Shin Dai-ichi Vinyl Corporation), 62 parts by mass of an epoxy plasticizer (Monocizer W-150, manufactured by DIC Corporation; viscosity: 85 mPa·s; gelation end-point temperature: 121° C.), 3 parts by mass of a heat stabilizer (GLECK ML-610A, manufactured by Showa Varnish Co., Ltd.), and, as other additives, 6 parts by mass of a viscosity depressant (viscosity depressant VISCOBYK-5125, manufactured by BYK Japan KK) and 6 parts by mass of a dispersant (Disperplast-1150, manufactured by BYK Japan KK), and 90 parts by mass of a phase change material (Thermo Memory FP-27, manufactured by Mitsubishi Paper Mills Limited; average particle diameter: 50 µm; melting point: 27° C.; water content: 0.9% by mass) in the form of microcapsules having a paraffin encapsulated using an outer shell made of a melamine resin were blended together to prepare a heat-storage composition. A calculated value of the HSP distance between the plasticizer and the phase change material used was 22.30, a calculated value of the HSP distance between the plasticizer and the vinyl chloride resin was 4.6, and an absorption of the plasticizer into 100 parts by mass of the phase change material used was 81 parts by mass.

Example 2

A heat-storage composition was prepared in substantially the same manner as in Example 1 except that the amount of the incorporated phase change material used in Example 1 was changed to 110 parts by mass.

Example 3

A heat-storage composition was prepared in substantially the same manner as in Example 1 except that, instead of the epoxy plasticizer used in Example 1, a polyester plasticizer (Polycizer W-230H, manufactured by DIC Corporation; viscosity: 220 mPa·s; gelation end-point temperature: 136° C.) was used. A calculated value of the HSP distance between the plasticizer and the phase change material used was 23.20, a calculated value of the HSP distance between the plasticizer and the vinyl chloride resin was 6.4, and an absorption of the plasticizer into 100 parts by mass of the phase change material used was 72 parts by mass.

Example 4

A heat-storage composition was prepared in substantially the same manner as in Example 3 except that the amount of the incorporated phase change material used in Example 3 was changed to 60 parts by mass.

Example 5

A heat-storage composition was prepared in substantially the same manner as in Example 1 except that the amount of the incorporated polyvinyl chloride resin particles used in Example 1 was changed to 60 parts by mass.

Example 6

A heat-storage composition was prepared in substantially the same manner as in Example 1 except that, instead of the polyvinyl chloride resin particles having a polymerization degree of 900 used in Example 1, polyvinyl chloride resin particles having a polymerization degree of 1,800 (ZEST PQHT, manufactured by Shin Dai-ichi Vinyl Corporation) were used, and that the amount of the incorporated phase change material used in Example 1 was changed to 80 parts by mass.

Example 7

A heat-storage composition was prepared in substantially the same manner as in Example 1 except that, instead of the 90 parts by mass of the phase change material used in Example 1, 82 parts by mass of a phase change material (Micronal DS5001X, manufactured by BASF AG; particle diameter: 100 to 300 µm; melting point: 26° C.; water content: 0.8% by mass) in the form of microcapsules having a paraffin encapsulated using an outer shell made of a polymethyl methacrylate (PMMA) resin was used. A calculated value of the HSP distance between the plasticizer and the phase change material used was 8.88, a calculated value of the HSP distance between the plasticizer and the vinyl chloride resin was 4.6, and an absorption of the plasticizer into 100 parts by mass of the phase change material was 129 parts by mass.

Example 8

100 Parts by mass of polyvinyl chloride resin particles having a polymerization degree of 900 (ZEST PQ92, manufactured by Shin Dai-ichi Vinyl Corporation), 105 parts by mass of an epoxy plasticizer (Monocizer W-150, manufactured by DIC Corporation; viscosity: 85 mPa·s; gelation end-point temperature: 121° C.), 3 parts by mass of a heat stabilizer (GLECK ML-610A, manufactured by Showa Varnish Co., Ltd.), and, as other additives, 12 parts by mass of a viscosity depressant (viscosity depressant VISCOBYK-5125, manufactured by BYK Japan KK) and 12 parts by mass of a dispersant (Disperplast-1150, manufactured by BYK Japan KK), and 160 parts by mass of a phase change material (Thermo Memory FP-27, manufactured by Mitsubishi Paper Mills Limited; average particle diameter: 50 µm; melting point: 27° C.; water content: 0.9% by mass) in the form of microcapsules having a paraffin encapsulated using an outer shell made of a melamine resin were blended together to prepare a heat-storage composition.

Example 9

100 Parts by mass of polyvinyl chloride resin particles having a polymerization degree of 900 (ZEST PQ92, manufactured by Shin Dai-ichi Vinyl Corporation), 50 parts by mass of an epoxy plasticizer (Monocizer W-150, manufactured by DIC Corporation; viscosity: 85 mPa·s; gelation end-point temperature: 121° C.), 3 parts by mass of a heat stabilizer (GLECK ML-610A, manufactured by Showa Varnish Co., Ltd.), and 25 parts by mass of a phase change material (Thermo Memory FP-27, manufactured by Mitsubishi Paper Mills Limited; average particle diameter: 50 μm; melting point: 27° C.; water content: 0.9% by mass) in the form of microcapsules having a paraffin encapsulated using an outer shell made of a melamine resin were blended together to prepare a heat-storage composition.

Example 10

A heat-storage composition was prepared in substantially the same manner as in Example 7 except that the amount of the incorporated phase change material used in Example 7 was changed to 68 parts by mass.

Example 11

A heat-storage composition was prepared in substantially the same manner as in Example 1 except that the amount of the incorporated polyvinyl chloride resin particles used in Example 1 was changed to 60 parts by mass, and that the amount of the incorporated phase change material was changed to 100 parts by mass.

Example 12

A heat-storage composition was prepared in substantially the same manner as in Example 11 except that the amount of the incorporated phase change material used in Example 11 was changed to 130 parts by mass.

Example 13

A heat-storage composition was prepared in substantially the same manner as in Example 1 except that, instead of the epoxy plasticizer used in Example 1, a benzoic acid plasticizer (Monocizer PB-10, manufactured by DIC Corporation; viscosity: 80 mPa·s; gelation end-point temperature: 100° C. or lower) was used. A calculated value of the HSP distance between the plasticizer and the phase change material used was 17.10, a calculated value of the HSP distance between the plasticizer and the vinyl chloride resin was 1.4, and an absorption of the plasticizer into 100 parts by mass of the phase change material used was 96 parts by mass.

Comparative Example 1

A heat-storage composition was prepared in substantially the same manner as in Example 1 except that the amount of the incorporated phase change material used in Example 1 was changed to 150 parts by mass.

Comparative Example 2

A heat-storage composition was prepared in substantially the same manner as in Example 1 except that the amount of the incorporated phase change material used in Example 1 was changed to 50 parts by mass.

Comparative Example 3

A heat-storage composition was prepared in substantially the same manner as in Example 1 except that, instead of the epoxy plasticizer used in Example 1, a benzoic acid plasticizer (W-83, manufactured by DIC Corporation; viscosity: 220 mPa·s; gelation end-point temperature: 136° C.) was used, and that the amount of the incorporated phase change material used in Example 1 was changed to 30 parts by mass. A calculated value of the HSP distance between the plasticizer and the phase change material used was 18.90, a calculated value of the HSP distance between the plasticizer and the vinyl chloride resin was 1.7, and an absorption of the plasticizer into 100 parts by mass of the phase change material used was 90 parts by mass.

The methods for evaluating the heat-storage compositions obtained in the Examples and the Comparative Examples above and the like are as shown below.

<Conditions for Measurement of Plasticizer Viscosity>
Measuring apparatus: Brookfield viscometer ("DVM-B type", manufactured by Tokyo Keiki Co., Ltd.)
Conditions for measurement: temperature: 25° C., No. 2 rotor, 30 rpm <Plasticizer Absorption>
An absorption of a plasticizer into a heat storage material was measured by the below-described method in accordance with JIS K5101-13-1. A sample obtained by weighing 1 g (2 g in Example 5) of a heat storage material was placed on a glass plate, and a plasticizer was dropwise added to the sample from a burette so that 4 to 5 droplets of the plasticizer were added at a time, and the plasticizer was kneaded into the sample using a palette knife made of steel. This was repeated and the dropwise addition of the plasticizer was continued until a solid mass of the plasticizer and the sample was formed. Thereafter, one droplet of the plasticizer was added at a time and completely kneaded into the mass, and this was repeated, and a point in time when the mass had become a smooth paste was determined as an end point, and the absorption at the end point was taken as an absorption of the plasticizer.

<Conditions for Measurement of Heat-Storage Composition Viscosity>
(Cylinder-Type Rotational Viscometer)
With respect to the heat-storage compositions obtained in the Examples and the Comparative Examples, the materials constituting each composition were mixed together so that the total weight became 300 g, and homogeneously dispersed using Homogenizing Disper at about 500 rpm for 2 minutes to obtain a measurement sample. The liquid temperature of the measurement sample was adjusted to 25° C., and a viscosity of the sample was measured by means of a cylinder-type rotational viscometer.
Measuring apparatus: Viscotester VT-04 (manufactured by Rion Co., Ltd.)
Conditions for measurement: temperature: 25° C., No. 2 rotor (62.5 rpm)

<Steady Shear Viscosity>
With respect to the heat-storage compositions obtained in the Examples and the Comparative Examples, a steady shear viscosity was measured in accordance with JIS K 7117-2 at a shear rate in the range of from 0.1 to 700 [1/s] under conditions at a temperature of 25° C. by means of rotational Rheometer MCR102, manufactured by Anton Paar GmbH, using parallel plate PP50 (diameter: 50 mm). The measurement was conducted as follows. The composition was blended and then homogeneously dispersed using Homogenizing Disper at about 500 rpm for 2 minutes to obtain a measurement sample, and about 2 g of the sample was placed on a specimen carrier of the rheometer and a parallel plate for measurement was brought downwards so that the sample was sandwiched with a gap of about 1.1 to 1.3 mm, and pre-shear was preliminarily applied to the sandwiched sample in order to make equal the states of the all samples before subjected to main measurement, followed by the main measurement. Conditions for pre-shear were such that the shear rate was 10 [1/s] and the application time was 60 [sec].

<Dynamic Viscoelasticity Measurement>

With respect to the heat-storage compositions obtained in the Examples and the Comparative Examples, a dynamic viscoelasticity was measured in accordance with JIS K 7244-10 at an angular frequency of 0.3 to 100 rad/s under conditions at a temperature of 25° C. and at a strain of 0.1% by means of rotational Rheometer MCR102, manufactured by Anton Paar GmbH, using parallel plate PP50 (diameter: 50 mm). The measurement was conducted as follows. The composition was blended and then homogeneously dispersed using Homogenizing Disper at about 500 rpm for 2 minutes to obtain a measurement sample, and about 2 g the sample was placed on a specimen carrier of the rheometer and a parallel plate for measurement was brought downwards so that the sample was sandwiched with a gap of about 1.1 to 1.3 mm, and pre-shear was preliminarily applied to the sandwiched sample in order to make equal the states of the all samples before subjected to main measurement, followed by the main measurement. Conditions for pre-shear were such that the shear rate was 10 [1/s] and the application time was 60 [sec].

<Application Properties>

With respect to the heat-storage compositions obtained in the Examples and the Comparative Examples, a coating film having a thickness of 3 mm was formed using an automatic applicator.

The obtained coating film was visually evaluated in accordance with the criteria shown below.

◯: In the entire application area, continuous coating film formation was possible.

X: In the application area, a coating defect was caused in the applied composition, and continuous coating film formation was impossible.

<Evaluation of Thick-Film Form Retention Properties>

With respect to the heat-storage compositions obtained in the Examples and the Comparative Examples, 6 g of the composition was flowed onto a steel plate at a point for 15 seconds, and allowed to stand for 60 seconds, and then subjected to gelation by heating at a dryer temperature of 150° C. for 8 minutes to obtain a heat storage sheet. An area and a thickness of the obtained heat storage sheet were measured, and evaluated in accordance with the criteria shown below.

◯: The thickness is 2 mm or more and the area is 50 cm2 or less.

X: The thickness is less than 2 mm and the area is more than 50 cm2.

<Measurement of a Water Content>

With respect to the heat-storage compositions obtained in the Examples and the Comparative Examples, a water content was measured in accordance with JIS K0068 Water content measurement method for chemical products b) drying loss method.

10 g of each of the heat-storage compositions obtained in the Examples and the Comparative Examples was placed in a flat weighing bottle (specified in JIS R 3503; body diameter: 60 mm×height: 30=; capacity: 25 ml), and the weighing bottle was placed in a dryer at 105° C. and a mass of the bottle was measured every one hour until the mass became a constant mass (constant mass: a mass at the time when a difference between a mass and the mass previously measured is 1/1,000 or less).

$$W=(S1-S2)/(S1-S3)\times 100$$

W: Water content (%)

S1: Mass (g) of the sample and the weighing bottle before dried

S2: Mass (g) of the sample and the weighing bottle after dried

S3: Mass (g) of the weighing bottle

<Evaluation of Appearance>

The heat-storage compositions obtained in the Examples and the Comparative Examples were individually applied onto a steel plate so that the thickness of the applied composition was 3 mm, and subjected to gelation by heating at a dryer temperature of 150° C. for 8 minutes to obtain a heat storage sheet. With respect to the obtained heat storage sheet, a portion 10 cm square was checked whether or not there was a blister, and evaluated in accordance with the criteria shown below.

⊙: A blister or depression having a diameter of 5 mm or more is not found.

◯: The number of blisters or depressions having a diameter of 5 mm or more is less than 5.

X: The number of blisters or depressions having a diameter of 5 mm or more is 5 or more.

TABLE 1

|  | Example 1 | Example 2 | Example 3 | Example 4 | Example 5 | Example 6 | Example 7 | Example 8 | Example 9 |
|---|---|---|---|---|---|---|---|---|---|
| Viscotester viscosity [dPa · s] | 150 | 280 | 270 | 160 | 130 | 150 | 220 | 160 | 150 |
| Steady shear viscosity [dPa · s] | 17.6 | 27.2 | 23.6 | 10.2 | 9.4 | 10.3 | 31.1 | 15.4 | 12.9 |
| Storage elastic modulus ($\omega = 1$) [Pa] | 10.5 | 17.6 | 8.3 | 3.5 | 7.1 | 6.4 | 48.4 | 13.4 | 17.3 |
| Loss elastic modulus ($\omega = 1$) [Pa] | 15.7 | 24.2 | 16.2 | 9.4 | 10.8 | 10.7 | 55.3 | 16.9 | 14.8 |
| Application properties | ◯ | ◯ | ◯ | ◯ | ◯ | ◯ | ◯ | ◯ | ◯ |
| Thick-film form retention properties | ◯ | ◯ | ◯ | ◯ | ◯ | ◯ | ◯ | ◯ | ◯ |
| Evaluation of appearance | ⊙ | ⊙ | ⊙ | ⊙ | ⊙ | ⊙ | ⊙ | ⊙ | ⊙ |

TABLE 2

|  | Example 10 | Example 11 | Example 12 | Example 13 | Comparative Example 1 | Comparative Example 2 | Comparative Example 3 |
|---|---|---|---|---|---|---|---|
| Viscotester viscosity [dPa·s] | 170 | 170 | 300 | 300 | 1100 | <100 | 200 |
| Steady shear viscosity [dPa·s] | 29.4 | 43.5 | 135 | 23.6 | — | 4.6 | 11.7 |
| Storage elastic modulus (ω = 1) [Pa] | 14.5 | 34.4 | 117 | 14.6 | — | 1.8 | 1.6 |
| Loss elastic modulus (ω = 1) [Pa] | 25.5 | 26.5 | 66.7 | 18.6 | — | 4.9 | 8.2 |
| Application properties | ○ | ○ | ○ | ○ | x | ○ | ○ |
| Thick-film form retention properties | ○ | ○ | ○ | ○ | — | x | x |
| Evaluation of appearance | ⊙ | ⊙ | ⊙ | ⊙ | — | ⊙ | ⊙ |

As apparent from the above tables, with respect to all the heat-storage compositions in Examples 1 to 13, the heat storage sheet being formed from each composition retained a maximum thickness of 2 mm or more and had a sheet area of 50 cm2 or less, and thus had advantageous thick film application properties despite containing the heat storage particles, and had advantageous thick-film form retention properties such that slump or the like did not occur. Particularly, the compositions in Examples 1 to 11 and 13 had a sheet area in the range of from 30 to 50 cm2, and were especially excellent in the application properties and the thick-film form retention properties. Further, the composition in Example 12 was excellent in the thick film formation. On the other hand, the compositions in Comparative Examples 1 to 3 did not have advantageous application properties or thick film application properties.

Example 14

A heat-storage composition was prepared in substantially the same manner as in Example 1 except that a phase change material having a water content of 1.5% by mass was used. Using the obtained heat-storage composition, a heat storage sheet was formed by the same method as the method for <Evaluation of appearance>, and evaluation of the appearance of the sheet was made. The result of the evaluation was ⊙ (a blister or depression having a diameter of 5 mm or more is not found).

Example 15

A heat storage sheet was formed in substantially the same manner as in Example 14 except that a phase change material having a water content of 2.1% by mass was used, and evaluation of the appearance of the sheet was made. The result of the evaluation was ○ (the number of blisters or depressions having a diameter of 5 mm or more is less than 5).

Example 16

A heat storage sheet was formed in substantially the same manner as in Example 15 except that the drying temperature was changed to 130° C., and evaluation of the appearance of the sheet was made. The result of the evaluation was ⊙ (a blister or depression having a diameter of 5 mm or more is not found).

Example 17

A heat storage sheet was formed in substantially the same manner as in Example 14 except that the same heat-storage composition as in Example 1 was used as a heat-storage composition, and that the drying temperature was changed to 165° C., and evaluation of the appearance of the sheet was made. The result of the evaluation was ○ (the number of blisters or depressions having a diameter of 5 mm or more is less than 5).

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:
1. A heat-storage composition, comprising:
   a resin;
   a heat storage material; and
   a plasticizer,
   wherein the composition has a viscosity of 100 decipascal seconds (dPa·s) to 1,000 dPa·s, as measured with a cylinder-type rotational viscometer, and a storage elastic modulus (G') of 3 Pa or more at an angular frequency of 1 rad/s, as measured by a dynamic viscoelasticity measurement method at a temperature of 25° C. and at a strain of 0.1%, and
   wherein a HSP distance between the heat storage material and the plasticizer is 6 or more and 40 or less.
2. The composition according to claim 1, wherein the composition has a loss elastic modulus (G") of 10 Pa or more at an angular frequency of 1 rad/s, as measured by a dynamic viscoelasticity measurement method at a temperature of 25° C. and at a strain of 0.1%.
3. The composition according to claim 1, wherein the composition has a steady shear viscosity of 30 Pa·s or less.
4. The composition according to claim 1, wherein the composition comprises 10 to 80% by mass of the heat storage material.
5. The composition according to claim 1, wherein the resin is a thermoplastic resin.
6. The composition according to claim 1, wherein 100 parts by mass of the heat storage material absorbs 30 to 150 parts by mass of the plasticizer.
7. The composition according to claim 1, wherein the plasticizer is an epoxy plasticizer.

8. The composition according to claim 1, wherein the heat storage material is a plurality of microcapsules,
   wherein each of the microcapsules comprises a resin outer shell and a phase change material that is contained within the resin outer shell.

9. The composition according to claim 1, wherein the heat storage material has a water content of 3% by mass or less.

10. A method for producing a heat storage sheet, the method comprising:
   casting a heat-storage composition to form a coating film; and
   drying the coating film by heating at a temperature of 150° C. or lower,
   wherein the heat-storage composition comprises:
   a resin;
   a heat storage material; and
   a plasticizer,
   wherein the heat-storage composition has a viscosity of 100 dPa·s to 1,000 dPa·s, as measured with a cylinder-type rotational viscometer, and a storage elastic modulus (G') of 3 Pa or more at an angular frequency of 1 rad/s, as measured by a dynamic viscoelasticity measurement method at a temperature of 25° C. and at a strain of 0.1%, and
   wherein a HSP distance between the heat storage material and the plasticizer is 6 or more and 40 or less.

11. The method according to claim 10, wherein the heat storage sheet obtained after drying has a thickness of 1 mm or more.

12. The method according to claim 10, wherein the heat storage material has a water content of 3% by mass or less.

* * * * *